Feb. 16, 1954  C. W. BROW  2,669,155
EXPOSURE METER FOR MOVIE CAMERAS
Filed June 29, 1951  2 Sheets-Sheet 1
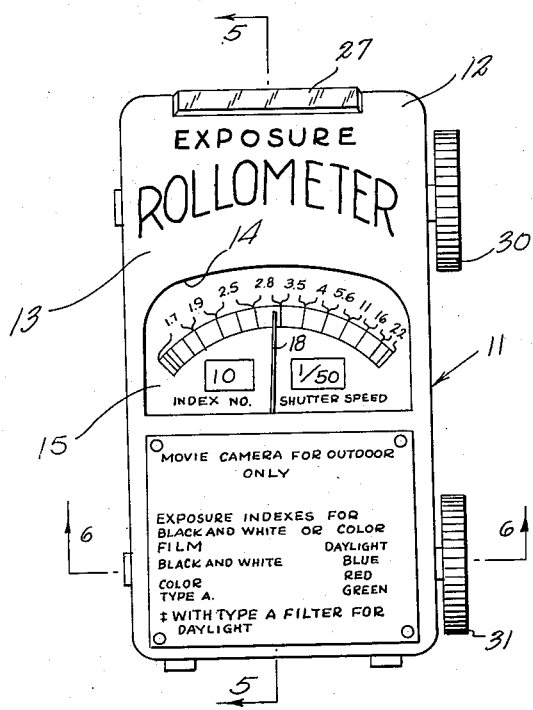
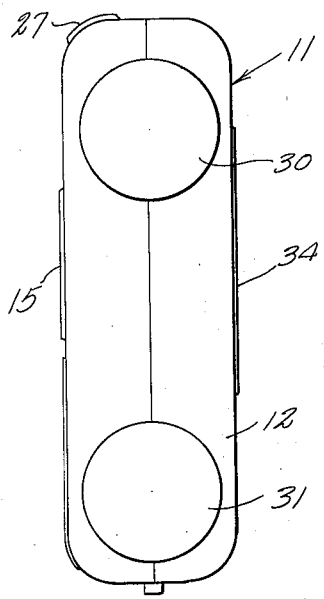
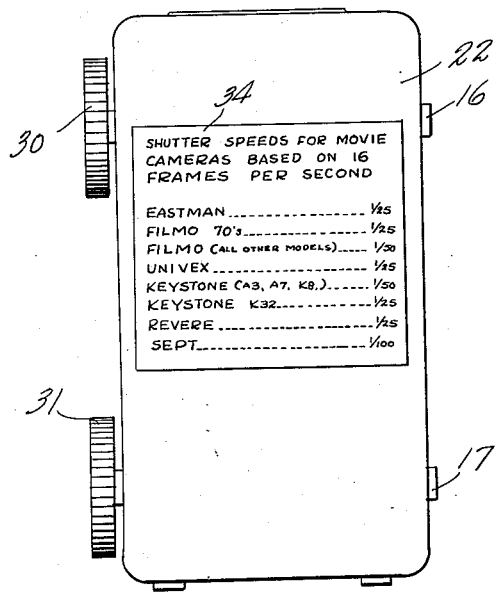
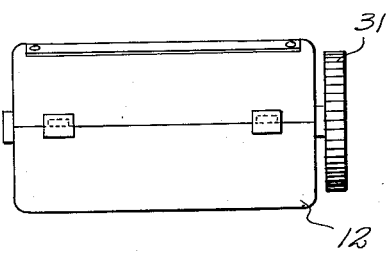
INVENTOR
CHESTER W. BROW,
BY
McMorrow, Berman & Davidson
ATTORNEYS Feb. 16, 1954 — C. W. BROW — 2,669,155
EXPOSURE METER FOR MOVIE CAMERAS
Filed June 29, 1951 — 2 Sheets-Sheet 2
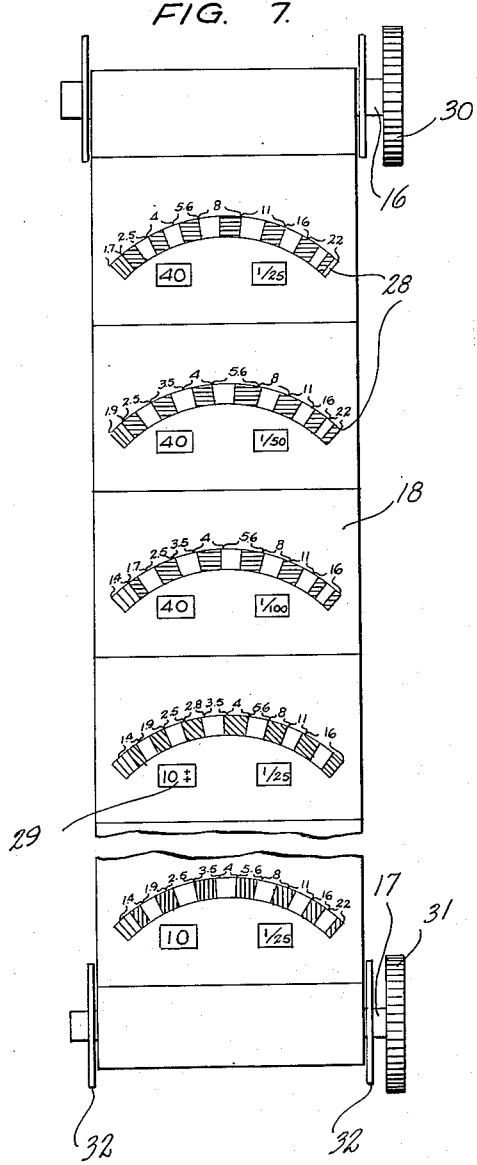
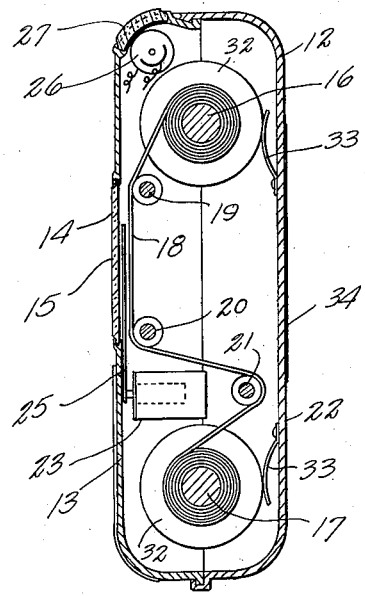
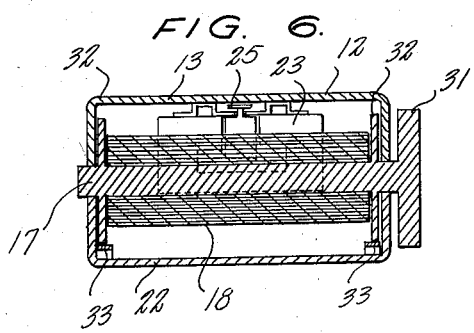
INVENTOR.
CHESTER W. BROW.
BY
McMorrow, Berman + Davidson
ATTORNEYS Patented Feb. 16, 1954

2,669,155

UNITED STATES PATENT OFFICE 2,669,155

EXPOSURE METER FOR MOVIE CAMERAS

Chester W. Brow, Whitman, Mass.

Application June 29, 1951, Serial No. 234,175

1 Claim. (Cl. 88—23)

This invention relates to exposure meters used in photography, and more particularly to an improved exposure meter of the photoelectric type adapted to be employed for selecting the correct diaphragm aperture for a particular degree of light intensity and for a particular type of film and for a particular shutter speed employed.

A main object of the invention is to provide a novel and improved exposure meter particularly useful for movie cameras, which is simple in construction, which is compact in size, which is easy to adjust in accordance with the particular type of film and shutter speed, and which is easy to read.

A further object of the invention is to provide an improved exposure meter of the photoelectric type for use in selecting the correct diaphragm aperture for a movie camera in accordance with the degree of light intensity on the subject being photographed, the improved exposure meter being inexpensive to manufacture, being durable in construction, being easy to manipulate and involving relatively few parts.

Further objects and advantages of the invention will become apparent from the following description and claim, and from the accompanying drawings, wherein:

Figure 1 is a front elevational view of an improved exposure meter constructed in accordance with the present invention;

Figure 2 is a side elevational view of the exposure meter of Figure 1;

Figure 3 is a rear elevational view of the exposure meter of Figures 1 and 2;

Figure 4 is a bottom view of the improved exposure meter of Figures 1 to 3;

Figure 5 is a vertical cross-sectional view taken on the line 5—5 of Figure 1;

Figure 6 is a horizontal cross-sectional view taken on the line 6—6 of Figure 1;

Figure 7 is an elevational detail view showing the flexible band carrying the different diaphragm aperture-selecting scales and the supporting reels for said flexible band, as employed in the improved exposure meter shown in Figures 1 to 6.

Referring to the drawings, the improved exposure meter is designated generally at 11 and comprises a generally rectangular housing 12 of suitable rigid material, such as molded plastic or the like. The front wall of the housing, designated at 13, is formed with a viewing window 14 of substantial size which is provided with a transparent cover 15 of glass or any other suitable transparent material. Journaled transversely in the top and bottom portions of the housing 12 on opposite sides of the window 14 are the respective reels 16 and 17 on which are wound the respective opposite end portions of a band of flexible material, designated at 18. Designated at 19, 20 and 21 are respective guide rollers arranged as shown in Figure 5, the guide rollers 19 and 20 engaging the band 18 adjacent the respective upper and lower margins of the window 14 and supporting band in parallel relationship to the transparent cover 15 of the window. The guide roller 21 is located adjacent the rear wall of the housing, designated at 22, and the band 18 extends around said guide roller 21 adjacent said rear wall, and then is wound on the reel 17, whereby a space is defined immediately above reel 17, as shown in Figure 5. Mounted in this space in any suitable manner is a sensitive galvanometer 23 of conventional construction arranged with its axis extending normal to the front wall 13 of housing 12. Secured to the armature of the galvanometer is the pointer 25 which is disposed between the transparent window 15 and the portion of the band 18 located between the guide reels 19 and 20, as shown in Figure 5.

Designated at 26 is a photoelectric cell of a conventional type which is mounted in any suitable manner in the upper front corner portion of the housing 12 behind a transparent window 27 provided at said upper front corner portion. The photoelectric cell 26 is connected to the galvanometer 23 and is arranged to energize said galvanometer in the usual manner responsive to the reception of light flux. It will be understood that the indicating needle 25 will be deflected in accordance with the intensity of the light impinging on the photoelectric cell 26.

As shown in Figure 7, the band 18 is inscribed with a series of arcuate scales 28 indicating the different correct diaphragm apertures corresponding to different degrees of the intensity of the light coming from the subject toward the camera. The different scales 28 are each calibrated in accordance with a particular type of film employed in conjunction with a particular shutter speed. For example, the three upper arcuate scales 28 in Figure 7 correspond to the use of a type "40" film. Said three scales are respectively calibrated in accordance with the use of shutter speeds of $\frac{1}{25}$ of a second, $\frac{1}{50}$ of a second, and $\frac{1}{100}$ of a second, respectively. The two lower scales shown in Figure 7 designate the correct diaphragm apertures to be employed in conjunction with a type "10" film with a shutter speed of 1/25 of a second, but the upper scale is marked to indicate that a color filter is employed on the camera, as shown by the distinctive indicia 29.

The shaft of each of the reels 16 and 17 extends through the side wall of the housing 12 and has secured thereon an operating knob, said knobs being shown respectively at 30 and 31. Each of the reel shafts is formed inwardly adjacent the respective side walls of housing 12 with circular flanges 32, 32, which are engaged by respective leaf springs 33, 33 secured to the rear wall 22 of the housing, said leaf springs 33 frictionally securing the reels against rotation unless manually operated. Secured to the rear wall 22 of the housing is a plate member 34 inscribed with information as to the correct shutter speed and to the shutter speed employed in various different makes of movie cameras, enabling the user of the exposure meter to select the proper scale 28 to be employed for his camera.

In using the device, the operator selects the proper scale 28 in accordance with the type of camera which he is using and the type of film employed therein, due consideration being given to the use of a color filter with the camera, inasmuch as the use of a color filter requires a different exposure scale from that which would be employed where no color filter is used. The operator moves the required exposure scale into view by rotating either the knob 30 or the knob 31 until the proper scale is visible through the window 14. The device is then held so that light coming from the subject may pass through the transparent window 27 and impinge on the photocell 26, whereupon the indicating needle 18 swings to a position on the selected scale 28 opposite the correct diaphragm aperture. It is therefore clearly apparent that after selecting the proper scale 28, the aperture value is given by merely allowing light from the subject to impinge on the photoelectric cell 26.

While a specific embodiment of an improved exposure meter for use with movie cameras has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An exposure meter comprising a housing provided with a viewing window in the top thereof, a pair of reels journaled entirely within said housing on opposite sides of the window in spaced parallel relation, respective knobs connected to the reels externally of the housing, a flexible band mounted on said reels and arranged adjacent said window, said band being inscribed with a plurality of successive diaphragm aperture scales, each scale representing correct diaphragm apertures for different degrees of light intensity for a particular type of film and for a particular shutter speed, a photocell mounted in said housing and being arranged to receive light from the exterior of the housing, a galvanometer mounted in said housing adjacent one margin of said window and connected to said photocell, said galvanometer comprising a solenoid with its axis arranged normal to the plane of the window, an armature axially mounted therein a pointer secured to said armature and extending between the flexible band and said window, the pointer being movable transversely of said band and over said aperture scales to indicate the correct diaphragm aperture corresponding to the intensity of light impinging on said photocell, a first roller mounted beneath said galvanometer, and a second roller mounted beneath said pointer adjacent said one margin of said window, said band passing under said first roller and over said second roller.

CHESTER W. BROW.

References Cited in the file of this patent
UNITED STATES PATENTS

| Number | Name | Date |
| --- | --- | --- |
| 2,203,209 | Weston | June 4, 1940 |
| 2,247,763 | Meyers | July 1, 1941 |
| 2,308,469 | McMaster | Jan. 12, 1943 |
| 2,550,936 | Poirette | May 1, 1951 |